Figure 1:
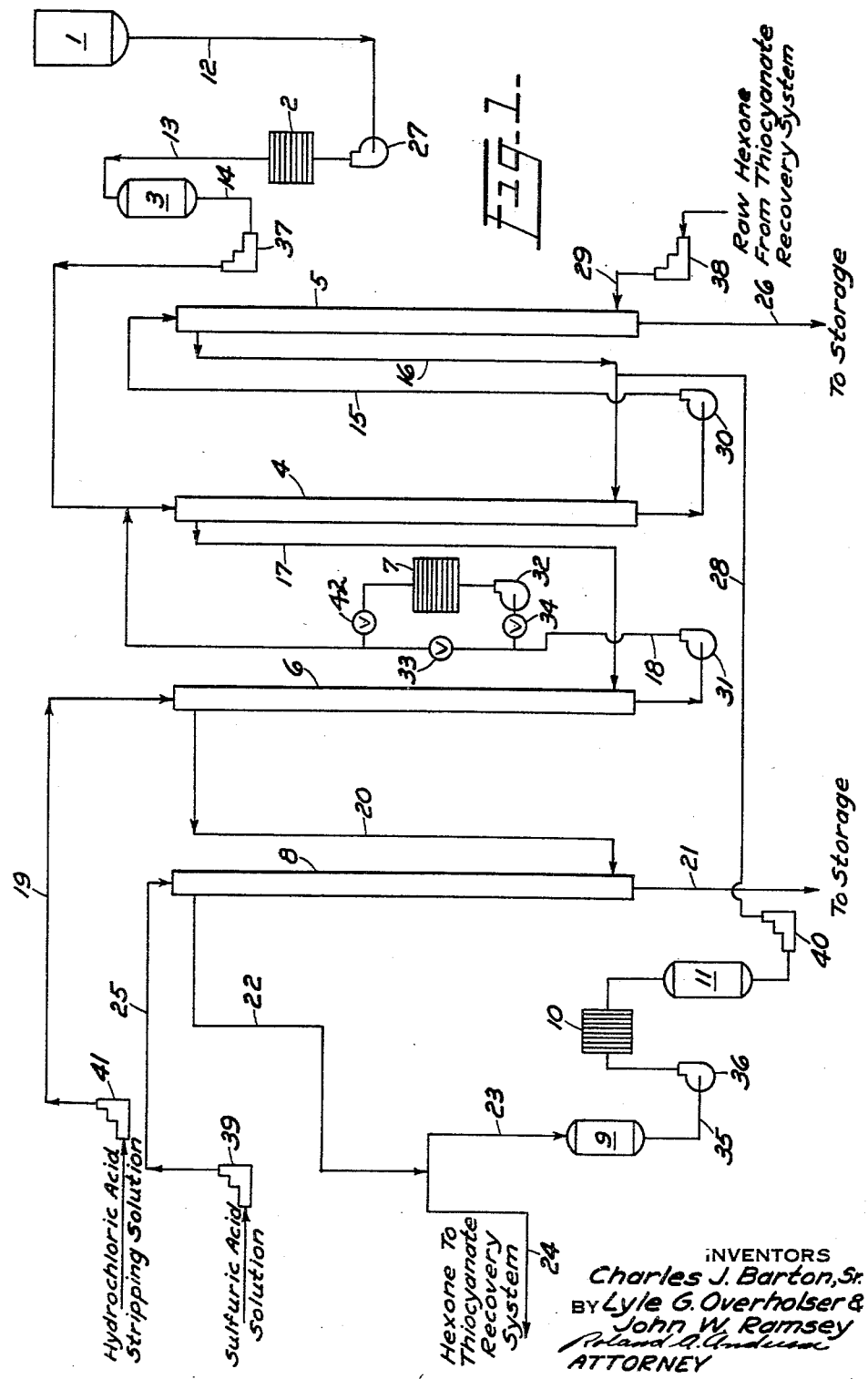

May 31, 1960   L. G. OVERHOLSER ET AL   2,938,769
SEPARATION OF HAFNIUM FROM ZIRCONIUM
Filed July 31, 1952   2 Sheets-Sheet 1

INVENTORS
Charles J. Barton, Sr.
BY Lyle G. Overholser &
John W. Ramsey
ATTORNEY INVENTORS
Charles J. Barton, Sr.
BY Lyle G. Overholser &
John W. Ramsey
ATTORNEY United States Patent Office 2,938,769
Patented May 31, 1960

2,938,769

SEPARATION OF HAFNIUM FROM ZIRCONIUM

Lyle G. Overholser, Charles J. Barton, Sr., and John W. Ramsey, Oak Ridge, Tenn., assignors to the United States of America as represented by the United States Atomic Energy Commission Filed July 31, 1952, Ser. No. 301,902

3 Claims. (Cl. 23—23)

Our invention relates to an improved process for purifying zirconium and more particularly to the removal of hafnium impurity from zirconium values.

The hafnium content of zirconium ores varies from about 1% to about 54% by weight with an average of about 3%. Zirconium and hafnium have almost similar chemical properties, and for this reason it has been found extremely difficult to effect their separation, even after considerable processing and purification. Thus, commercially available zirconium metal and zirconium compounds usually contain from about 1% to about 2% hafnium by weight. For most industrial applications, this material may be utilized with satisfactory results. However, in certain instances, it is necessary to employ an extremely pure grade of zirconium, particularly zirconium which is substantially hafnium-free. For example, the presence of only a few tenths of a percent of hafnium renders zirconium unsuitable for use as an internal structural material in neutronic reactors due to hafnium's unusually high neutron absorption cross-section, whereas substantially hafnium-free zirconium is eminently satisfactory for this purpose.

Numerous methods have been used to separate hafnium from zirconium. These methods have included fractional crystallization or precipitation, ion-exchange, fractional distillation of relatively volatile compounds, electromagnetic separation, thermal diffusion, preferential extraction, electrochemical separation, and differential decomposition of salts. However, these methods either required excessive repetition of steps to obtain the required separation, or were unadaptable to economically feasible large scale production, i.e., production involving tonnage quantities of substantially hafnium-free zirconium.

One of the more promising of these prior art methods, was disclosed by W. Fischer and Walter Chalybaeus in Z. Anorg. Chem. 255, 79–100 (1947), and 255, 277–286 (1948). The object of this method was to prepare zirconium-free hafnium rather than hafnium-free zirconium and comprised substantially the following preferred procedure: An aqueous phase containing zirconium and hafnium as sulfates, ammonium thiocyanate, and, in a few instances, ammonium sulfate, was contacted with diethyl ether in which thiocyanic acid had been dissolved. The hafnium is preferentially extracted into the organic phase.

In view of their desire to prepare only small quantities of enriched hafnium, Fischer et al. did not further process the slightly hafnium-depleted aqueous phase containing relatively large quantities of zirconium, but rather recycled the hafnium-enriched organic phase to further remove zirconium and, thereby, further enrich the hafnium. Thus, no suitable method was presented for obtaining zirconium even remotely approaching the substantially hafnium-free condition as would be required, for example, in a neutronic reactor. Furthermore, the low solubility of zirconium in sulfate solutions would have constituted an extremely serious obstacle to any high rate of production of hafnium-free zirconium.

Furthermore, we find that the certain critical ranges and combinations of process conditions described hereinafter for producing substantially hafnium-free zirconium differ significantly from the conditions described by Fischer et al. for the production of hafnium low in zirconium content, and that numerous unusual process modifications are necessary to insure the feasible production of commercial quantities of hafnium-free zirconium. In addition, the preferred solvent used by Fischer et al., diethyl ether, is excessively volatile, somewhat soluble in water and relatively expensive. Also, thiocyanic acid decomposes in diethyl ether at a rate which, in addition to the above disadvantages, makes this solvent especially unsuitable for large scale operations. Fischer et al. tried to solve certain of these disadvantages by using other solvents. Butyl alcohol, butyl acetate and di-N-propyl ether were tried but little or no separation was achieved.

An object of our invention, therefore, is to provide a process for substantially completely removing hafnium impurity from zirconium.

Another object of our invention is to provide an economically feasible, continuous, plant scale process for separating zirconium from hafnium.

Another object of our invention is to provide an organic solvent in the herein described process which is superior to prior art solvents with respect to zirconium-hafnium separability, volatility, cost, water solubility, and thiocyanic acid-organic phase stability.

Still another object is to produce zirconium of sufficiently high purity and resulting low neutron absorption cross-section to permit its use in neutronic reactors.

Other objects and advantages of our invention will be apparent from the following description.

In accordance with our invention, hafnium may be substantially quantitatively removed from zirconium on a large scale by a process which comprises contacting an acidic aqueous phase containing soluble hafnium and zirconium values together with chloride ions with a substantially water immiscible ketone solvent phase, at least one of said phases containing thiocyanic acid, separating the resulting organic phase from the resulting hafnium depleted aqueous phase and treating said hafnium depleted aqueous phase with fresh portions of the ketone solvent phase.

Our process is particularly adaptable to the tonnage production of substantially hafnium-free zirconium in a continuous plant operation which requires the attention of only a few individuals and represents a unique and significant technological advance over the many prior art procedures herein identified.

Employing our process, the hafnium content of commercial quantities of zirconium may be readily reduced, in a safe, continuous, and economically feasible manner, to the strikingly low amount of about 100 parts per million and with about a 96% overall plant yield of zirconium.

Furthermore, we find that a critical arrangement of the numerous process variables as hereinafter discussed results in an unusual degree of stabilization of our process solutions as compared to the lack of stability noted by Fischer et al. in their preferred process and, therefore, contributes materially to the success of our continuous process.

In general, we find that substantially water immiscible organic ketone solvents are suitable for use with our invention. Satisfactory results may be achieved, for example, utilizing such ketone solvents as hexone (methyl isobutyl ketone), methyl n-amyl ketone, methyl n-hexyl ketone, methyl isopropyl ketone and ethyl butyl ketone.

Particularly satisfactory are hexone and methyl n-amyl ketone, while hexone is preferred.

Numerous significant advantages, some of which appear entirely unpredictable, result from our discovery that ketones are significantly superior to other solvents as employed in the process herein described, particularly when employed in conjunction with chloride ions. Substantially all of the disadvantages of the prior art solvents are overcome. Thus, ketones are less volatile, cheaper in the case of hexone, less soluble in water and result in a smaller rate of decomposition of thiocyanic acid, as compared to the diethyl ether preferred in the process of Fischer et al. These advantages for ketones are considerably further enhanced by the discovery that better separation factors can be achieved than with diethyl ether when using the optimum conditions herein described. A still further advantage is that ketones are unusually amenable to a recycling step as hereinafter described, since we find that metal cations may be readily stripped from the ketones, while substantially all the thiocyanic acid remains, the resulting ketone-thiocyanic acid phase being satisfactory for direct reuse. Process costs are thereby materially lessened. In addition, we find that the ketones, by themselves, may be advantageously employed for recovering thiocyanate values at suitable stages in our process.

In view of the availability of commercial quantities of hexone and its superiority over other ketones in our process, our invention will be further illustrated specifically with respect to hexone.

We note that while hexone is by far the preferred solvent, some decomposition of thiocyanic acid dissolved therein still takes place, whereas in butyl acetate, which yields a considerably lower degree of separation of hafnium from zirconium, there is very slight decomposition of thiocyanic acid. We have found that an inpredictable stabilization of thiocyanic acid appears to result when approximately 20% to approximately 25% butyl acetate by volume is added to hexone, the separation factor remaining substantially unaffected. This range appears to be critical since, with less butyl acetate, less resistance to decomposition is noted, while with more butyl acetate, the separation factor was significantly decreased. However, for large scale production, we still prefer to utilize only hexone, since it is found more efficient to merely continuously separate the small amount of decomposition products by such conventional means as a filter press rather than suffer the inconvenience of handling two solvents instead of one.

When employing any of the solvents or solvent combinations taught herein, although not critical, suitable ratios of organic to aqueous phase in a batch or continuous type process are from about 9 to about 3 parts organic phase to about 1 part aqueous phase, while approximately 3 parts organic phase to approximately 1 part aqueous phase is preferred.

Any zirconium compound not excessively reactive with other process constituents, and relatively soluble in aqueous acidic solutions, may be hafnium-decontaminated in accordance with our process. Suitable compounds are, for example, $ZrOCl_2$, $ZrCl_4$, $Zr(OH)_4$, and $Zr(ClO_4)_4$. However, it is preferred to add the zirconium in the form of $ZrCl_4$ or $ZrOCl_2 \cdot ZrCl_4$ and $ZrOCl_2$ are relatively highly soluble under the preferred extraction conditions, permitting a high rate of production, particularly in a continuous process, as compared to the highest achievable production rates using other less soluble zirconium compounds. In addition, the chlorides contribute a portion of the chloride ion concentration which we prefer to employ in our process.

When employing relatively soluble zirconium compounds such as $ZrCl_4$ or $ZrOCl_2$, suitable concentrations of zirconium in the aqueous phase are from about 0.5 molar to about 1.6 molar while a concentration of about 1.3 molar is preferred.

We find that the presence of a suitable quantity of free acid in the aqueous phase is necessary to achieve outstanding results. In this respect, mineral acids are suitable. However, $HNO_3$ introduces the disadvantage of reacting with thiocyanate, and $H_2SO_4$ limits the solubility of zirconium in solution due to the low solubility of $Zr(SO_4)_2$ as already discussed. HCl and $HClO_4$ are considered more suitable than any of the other acids for large scale operation and, in view of its lower cost, hydrochloric acid is greatly preferred. The use of hydrochloric acid greatly favors the extraction of both zirconium and hafnium and appears to contribute significantly to the stability of the aqueous phase, i.e. prevents hydrolysis and subsequent precipitation of metal ions, to a degree not attainable with other acids. This stability is particularly vital to a plant scale continuous process wherein large volumes of solution must traverse lengthy passages.

We find that the adverse effect of the sulfate anion in the prior art process herein discussed, added either as an acid or a neutral compound such as $(NH_4)_2SO_4$ or $Zr(SO_4)_2$, on zirconium solubility and the degree of extraction, may be overcome to an unexpected degree by using a system containing both sulfate and chloride. The solubility limit may be significantly raised, although still considerably lower than in the sulfate-free chloride system, while the separation factor is improved over the sulfate-free chloride system. Although excellent results are attainable with such a combination system, we still prefer, for continuous plant scale operation, the extreme simplicity of the sulfate-free chloride system which merely requires a larger number of theoretical extraction stages to achieve the same degree of separation at a much higher rate of production of substantially hafnium-free zirconium.

However, in the laboratory, where long columns are not mechanically expedient and where the production of only research quantities of hafnium-free zirconium may be desired, in the smallest possible size apparatus, the sulfate-chloride containing process might be advantageously employed.

Thus, in accordance with our invention, suitable concentrations of chloride in the aqueous phase in the form of hydrochloric acid are from about 0.5 molar to about 2 molar while a concentration of about 1 molar is preferred. If it is desired to employ a sulfate-chloride system, suitable concentrations of sulfate anion to be added to the above chloride concentrations are from about 0.01 molar to about 1 molar while a concentration of approximately 0.5 molar is preferred.

It is noted from previous discussions that sulfate and chloride anions may be employed in certain combinations in the aqueous phase of our system. There is no criticality as to the manner in which they are added as long as the desired range of total concentration of any single anion is achieved. Thus, in a sulfate-chloride system, sulfate may be added, for example, as $Zr(SO_4)_2$, $(NH_4)_2SO_4$, or $H_2SO_4$, while the chloride may be added, for example as $ZrCl_4$ or $ZrOCl_2$, or HCl. It is preferred, however, in the sulfate-chloride system, to add chloride ions in the form of $ZrOCl_2$ or $ZrCl_4$ and HCl and sulfate anions as $(NH_4)_2SO_4$.

Thiocyanic acid may initially be added to either the aqueous phase, the organic phase, or both. When added to only one phase, a sufficiently high concentration must be provided to result in suitable equilibrium concentration of thiocyanate in both phases during the extraction procedure. However, it is generally preferred to add thiocyanic acid to both phases. In the latter instance, we find that suitable concentrations of thiocyanate in the aqueous phase are from about 1 molar to about 3 molar while a concentration of about 2.5 molar is preferred. Similar concentrations are applicable to the organic phase. It is preferred to include thiocyanic acid in the aqueous phase via the compound $NH_4SCN$ (the hydrogen cation being provided by HCl or $H_2SO_4$ as herein described), while thiocyanic acid may be introduced into the organic phase by extraction of thiocyanic acid from an aqueous acidic solution of thiocyanate values as will be apparent in the following description.

Employing the reaction conditions as set forth in preceding paragraphs, zirconium, in a multi-stage batch process, usually ranging from approximately 6 to 12 stages, may be substantially freed from hafnium impurity. However, any process without recovery and recycle of various valuable reagents such as thiocyanate and hexone would be relatively costly to operate. We have discovered methods of accomplishing such recoveries and recycles which effect a many-fold reduction in operating expenses.

Thus, we have discovered that a simple stripping of the hafnium-enriched thiocyanate-containing organic phase resulting from the basic organic extraction step of our process, with a suitable concentration of sulfuric acid, serves to quantitatively remove hafnium from the organic phase with only a small loss of thiocyanate values, thus permitting recirculation of two costly process items. This is an important factor in making continuous, countercurrent plant operation possible.

Thus, for the latter purpose, suitable concentrations of sulfuric acid in aqueous solution are from about 2 normal to about 6 normal while a concentration of about 4 normal is preferred. Suitable ratios of the aqueous sulfuric acid phase to the organic phase are from about 1 part aqueous to about 3 to 5 parts organic, while about 1 part aqueous to about 4 parts organic is preferred.

Any valuable amounts of thiocyanate values remaining in the hafnium-containing aqueous effluent from the sulfuric acid scrubbing step may be recovered by a simple hexone extraction, and the resulting hexone-thiocyanate phase may then be combined with the other recycled hexone-thiocyanate phase.

For purposes of process efficiency and prevention of build up of impurities in the system, the thiocyanate-containing organic effluent remaining from the sulfuric acid scrubbing step may be split into two streams, one being recycled as already indicated, to the extraction step, the other being processed in a thiocyanate recovery system to separate thiocyanate values from the organic solvent, thereby providing for recycle of pure thiocyanate to the aqueous feed material. In the thiocyanate recovery system, the thiocyanate-hexone solution may be neutralized with ammonium hydroxide and the resulting two phases allowed to separate. The thiocyanate ions are quantitatively extracted from the hexone by this procedure, into the aqueous phase. The resulting thiocyanate-free organic solvent may then be utilized to recover the remainder of the thiocyanate values employed in our process which appear in the zirconium enriched aqueous product effluent from the zirconium extraction step.

We find that the thiocyanate values in this effluent may be readily recovered merely by scrubbing same with thiocyanate-free hexone obtained fresh or from the thiocyanate recovery system just described. The resulting thiocyanate-containing organic phase may then be re-employed in the zirconium extraction step. For thus recovering thiocyanate values, suitable ratios of organic to aqueous phases are from about 1 part organic to about 1–3 parts aqueous, while a ratio of 1 part organic to 2 parts aqueous is preferred.

We have also discovered that process efficiency may be considerably improved by stripping the hafnium enriched thiocyanate-containing hexone effluent from the extraction step, prior to the sulfuric acid scrubbing step, with an aqueous hydrochloric acid solution. We find that suitable concentrations of hydrochloric acid will preferentially strip a portion of the extracted zirconium from the already hafnium-enriched hexone phase and the resulting zirconium-containing hydrochloric acid stripping solution can be admitted directly to the extraction step at the feed point. The latter solution is found to contain an unexpectedly low amount of hafnium, usually not appreciably greater than the hafnium content of the zirconium plant feed material. Water alone is also suitable for stripping purposes but hydrochloric acid is more efficient and is preferred, especially since it is desired to introduce hydrochloric acid anyway into the feed material, as heretofore indicated. Suitable concentrations of hydrochloric acid in water for stripping purposes are from about 0.5 molar to about 4 molar while a concentration of approximately 3.5 molar is preferred. Suitable ratio of stripping solution to organic phase are from about 1 part stripping solution to about 4 parts to about 9 parts organic while a ratio of 1 part stripping to about 7 parts organic is preferred.

Since the hydrochloric acid requirements for the zirconium feed stream are supplied from the hydrochloric acid stripping column, no additional hydrochloric acid need be added to the feed when the disclosed hydrochloric acid recycle is employed. In fact, the optimum stripping concentration of hydrochloric acid (3.5 normal) may be too high for optimum extraction of zirconium from the feed and it may become desirable to partially neutralize the feed stream with an alkaline reagent, preferably ammonium hydroxide. It is noted that when zirconium tetrachloride is employed, its hydrolysis in water contributes even additional free acid to the system. We find that an improvement in the process may be achieved by adding approximately 1 mole of ammonium hydroxide for each mole of zirconium present before extraction, thus keeping the hydrochloric acid concentration in the extraction step within the preferred range herein specified.

Although the temperature is not critical to the success of our process, we find that the separation factor is roughly inversely proportional to the temperature. Thus a decrease in operating temperature results in an increase in separation factor; it is therefore desirable to operate at room temperature or at lower temperatures, and the separation factor is markedly improved by operation in the 0° C. to 5° C. range.

We find, using the preferred reaction conditions, that the time required for equilibrium to be reached is less than 30 seconds. Therefore, and in view of other advantages herein discussed, any suitable type of apparatus for enabling intimate contact of continuous streams of substantially immiscible liquid phases may be employed. The apparatus may comprise, for example, a continuous mixer-settler system, a simple batch mixing and separating system, or a continuous, countercurrent column system. The latter system is preferred and is hereinafter described.

The following is a briefly summarized description of a preferred embodiment of our invention. The separation is preferably carried out in columns in a continuous countercurrent manner. Column sections for extraction, stripping, scrubbing and thiocyanate recovery may be employed either combined in one column or in a multicolumn system.

Zirconium tetrachloride or oxychloride containing hafnium impurity is dissolved in water and the required quantities of ammonium thiocyanate and ammonium hydroxide are added to form the extraction feed solution. Feed solution is continuously pumped to an extraction column section. Hexone-thiocyanic acid solution is continuously pumped into the bottom of the extraction column countercurrent to the feed solution, and hafnium is preferentially extracted thereby. The resulting hafnium and thiocyanate containing hexone from the extraction column flows continuously into the stripping column, countercurrent to a continuous flow of a stripping solution of dilute hydrochloric acid. The resulting aqueous hydrochloric acid stripping solution containing stripped zirconium is continuously fed into the extraction column with the feed solution. The stripped hexone containing very pure hafnium flows into the scrubbing column where the hafnium is removed by scrubbing with a sulfuric acid solution. This hexone, free of metal, but still containing thiocyanic acid is recirculated to the extraction column.

For economical usage of thiocyanate, it is desirable to have the thiocyanate concentration in the product stream at a very low level. This is accomplished by continuously directing the aqueous zirconium-containing effluent solution from the extraction column into a thiocyanate recovery column. The thiocyanate recovery column is continuously fed with raw hexone at a rate of approximately ⅓ the total hexone flow. The resulting hexone effluent from this column contains thiocyanic acid at the proper concentration for extraction and is continuously mixed with the hexone entering the extraction column. Raw hexone to be fed to the thiocyanate recovery column is prepared from a portion of the sulfuric acid scrub hexone diverted to a thiocyanate recovery system for ammonium neutralization as herein described. Ammonium thiocyanate from this system is used in feed make-up.

Substantially hafnium-free zirconium solution is continuously removed from the extraction column and may be processed into the desired final form by conventional procedures.

A suitable, substantially continuous system for effecting a preferred embodiment of our invention is illustrated diagrammatically in the accompanying drawing.

In greater detail and referring to the drawing, tank 1 is provided for making up feed solution, and is supplied at the bottom with liquid discharge line 12 from which feed solution is forced through filter press 2 by centrifugal pump 27. Tank 3 is provided to store filtered solution received from filter press 2, through line 13, and is supplied at the bottom with liquid outlet line 14.

Column 4 is provided for contacting the aqueous and hexone phases and is supplied at the top with aqueous feed solution from feed storage tank 3 by line 14 and proportioning pump 37. Line 15 and centrifugal pump 30 serve to transfer the aqueous solution from the bottom of extraction column 4 to the top of recovery column 5 which is provided to recover thiocyanate values therefrom. Proportioning pump 38 and line 29 are utilized to introduce fresh hexone (source not shown) into the bottom of recovery column 5 and line 16 is employed to transfer the hexone phase from the top of recovery column 5 to the bottom of extraction column 4. Recovery column 5 is supplied with aqueous phase product exit line 26.

Stripping column 6 is employed for stripping, of its zirconium content, the hexone received at the bottom from the top of extraction column 4 via line 17. Line 19 communicates with the top of column 6 and supplies hydrochloric acid stripping solution (source not shown) as metered by proportionate pump 41. The bottom of column 6 is supplied with exit line 18 which, in cooperation with centrifugal pump 31, transfers aqueous hydrochloric acid solution used for stripping purposes in column 6, from the bottom of column 6 to the top of extraction column 4. Valves 33, 34, and 42 and centrifugal pump 32 are provided to side-pass a portion of the liquid from line 18, through filter press 7, and back to line 18. Column 6 is also provided at the top with waste exit line 20 which serves to carry stripped hexone to the bottom of scrubbing column 8, the latter being furnished to scrub the hexone entering from line 20 of extracted impurities, primarily hafnium. Line 25 communicates with the top of column 8 and supplies the aqueous $H_2SO_4$ scrubbing solution (source not shown) as metered by proportioning pump 39. Line 22 is employed to remove scrubbed hexone from the top of column 8 and is divided into lines 23 and 24; line 23 being employed to carry a portion of the scrubbed hexone to storage tank 9. Column 8, discharge line 35 and centrifugal pump 36 are utilized to process the organic solvent through filter press 10 and into pump head tank 11, from whence the filtered hexone is returned to the bottom of extraction column 4 by proportioning pump 40 and recycle line 28, while line 24 is employed to carry the remaining portion of scrubbed hexone to a thiocyanate recovery system described herein (not shown).

In a preferred operation of the apparatus just described, zirconium chloride, $NH_4SCN$, including make-up $NH_4SCN$ from the thiocyanate recovery system (not shown), and $NH_4OH$ are added in suitable portions to feed make-up tank 1. The resulting solution is discharged through line 12, pumped through filter press 2 by pump 27, and received by feed storage tank 3 through line 13. Feed solution is continuously released from feed storage tank 3 into discharge line 14 and continuously metered into the top of extraction column 4 by pump 37.

Concurrently, a suitable quantity of hydrochloric acid solution is continuously admixed, by means of line 18 from the bottom of stripping column 6, with the feed solution entering the top of column 4. The hydrochloric acid solution also includes any zirconium salvaged in the stripping column as hereinafter described. Meanwhile, hexonethiocyanic acid solution is continuously fed into the bottom of column 4 from the top of column 5 by solvent line 16 and from solvent recycle line 28 as continuously metered by pump 40 from head tank 11. The hexone continuously ascends column 4, contacting the continuously descending aqueous phase, and preferentially extracting hafnium therefrom.

The resulting zirconium enriched aqueous phase is continuously removed from the bottom of extraction column 4 and transferred to the upper portion of thiocyanate recovery column 5 by means of line 15 and pump 30. Raw hexone received from the thiocyanate recovery system (not shown) is continuously fed into the bottom of column 5 from hexone feed line 29 by pump 38 and continuously ascends column 5, contacting the continuously descending hafnium-depleted aqueous phase, recovering HSCN therefrom, and being removed at the top by means of solvent feed line 16. The resulting aqueous phase containing substantially hafnium-free zirconium product is continuously removed from the bottom of column 5 through line 26 and stored, for subsequent conversion to any desired hafnium-free zirconium compounds or zirconium metal.

Concurrently, hafnium enriched hexone is continuously transferred from the top of column 4 to the bottom of stripping column 6 through line 17 and continuously ascends column 6, contacting continuously descending aqueous hydrochloric acid solution which is continuously supplied by pump 41 and line 19 to the upper portion of column 6, the hydrochloric acid solution stripping any small amounts of extracted zirconium from the hexone phase. The hexone phase is continuously transferred from the top of column 6 to the bottom of column 8 through line 20 and in ascending column 8 is stripped of its hafnium content by a continuously descending aqueous $H_2SO_4$ solution supplied at the top of column 8 by pump 39 and scrubbing solution supply line 25, the resulting hafnium-containing sulfate solution being removed from the bottom of column 8 by means of line 21.

The hexone phase, containing thiocyanate, is continuously removed from the top of column 8 by line 22, and is split into two streams, line 24 carrying one stream to the thiocyanate recovery system, and line 23 carrying the other stream to storage tank 9 for subsequent removal by line 35 and pump 36 to filter press 10, and eventual reuse in the extraction step as already described.

Figure 2:
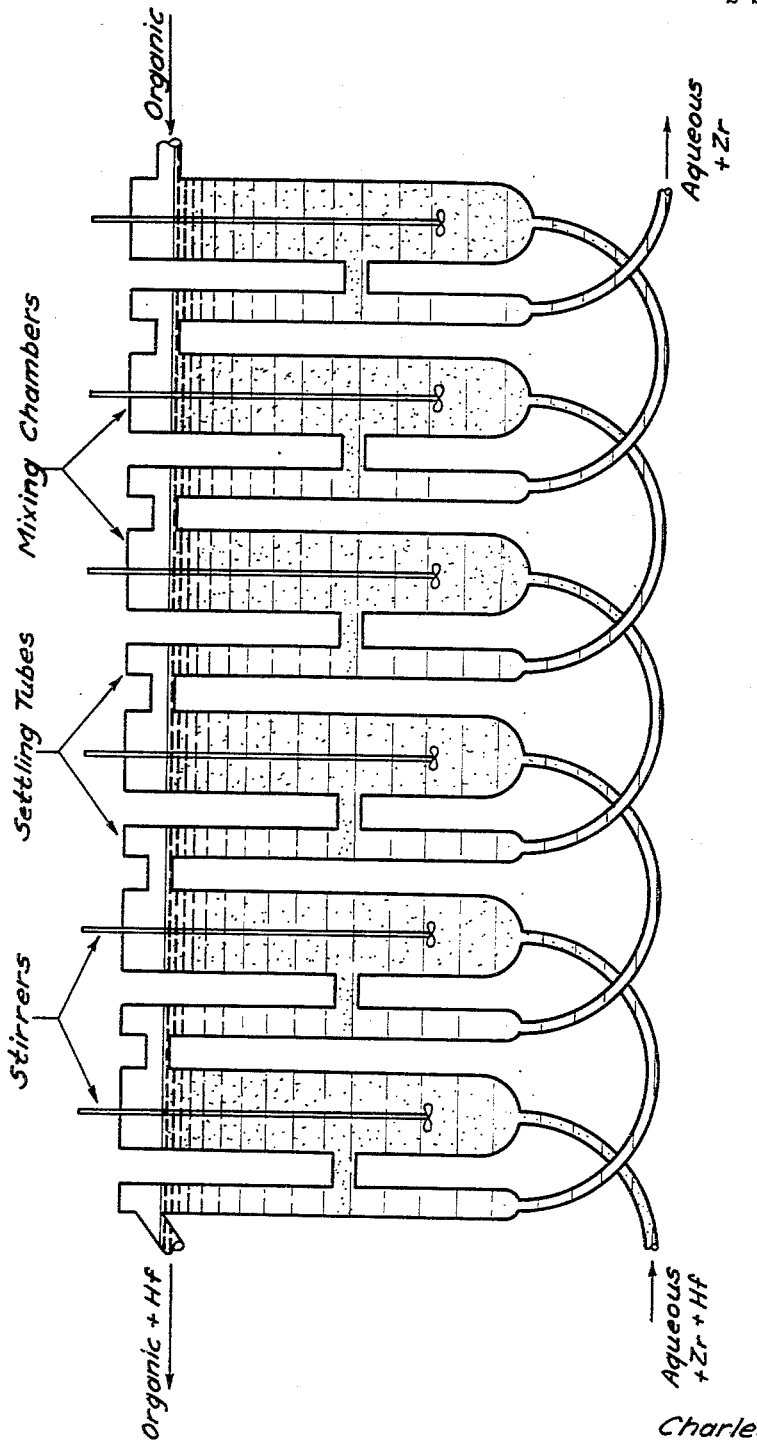

A mixer-settler type of apparatus may also be employed in a manner analogous to the operation of the column system just described. The general mechanism of the apparatus can be clearly understood by referring to Fig. 2. The apparatus is comprised of alternate mixing chambers and settling chambers through which a zirconium solution is passed countercurrent to an extracting solvent. The aqueous phase containing zirconium is introduced to a mixing chamber at the bottom while the solvent is introduced at the top. Air driven stirrers mix the two phases, and the mixtures pass through center outlets to settling chambers. Here the phases separate and advance to subsequent mixing chambers in opposite directions.

The following specific examples illustrate our invention in greater detail.

EXAMPLE I

In the apparatus illustrated diagrammatically in Fig. 1, 4 inch diameter Pyrex glass columns were employed, using the system described in our preferred embodiment, under the following conditions and with the following results:

Length of columns (total):
- Extraction (3 columns) ____ 180 ft.
- Stripping (2 columns) _____ 125 ft.
- Scrubbing (1 column) _____ 65 ft.
- Thiocyanate recovery (1 column) _____ 55 ft.

Hexone rate _____ 140 g.p.h.
SCN concentration in recycle hexone _____ 2.7 molar.
HCl rate, stripping section _____ 18–20 g.p.h.
HCl concentration _____ 3.5 molar.
SCN, concentration in _____ 0.0 molar.
SCN, concentration out _____ 2.5–3.0 molar.
Feed rate, zirconium oxychloride solution _____ 50 g.p.h.
HCl concentration _____ 1 molar.
HSCN concentration _____ 2.6 molar.
Zr concentration _____ 1 lb./gal.
$H_2SO_4$ rate, scrubber solution ____ 35 g.p.h.
$H_2SO_4$ concentration _____ 5 normal.
SCN conc., feed to thiocyanate recovery column _____ 1.60 molar.
SCN conc., discharge from thiocyanate recovery column _____ 0.1 molar.
SCN conc., hexone to column ____ 0.0 molar.
SCN conc., hexone from column _ 2.50 molar.
Rate of hexone to thiocyanate recovery column _____ 40 g.p.h.
Rate of aqueous solution in column 70 g.p.h.
Conc. Hf in raw feed _____ 1.5–2.0%.
Conc. Hf in product Zr _____ 100 p.p.m.
Conc. Zr in product Hf_____ Approximately 2%.
Yield of Zr product based on feed solution _____ 96%.
Percent recycle of hexone _____ 96.5–97.0%.
Percent loss of hexone _____ 3–3.5%.
Amount make-up hexone _____ 90 gals./day.

| | Optimum for Extraction Section | Optimum for Stripping Section |
|---|---|---|
| Distribution Coefficient Hf Org/Aq | 1.5 | 0.7 |
| Distribution Coefficient Zr Org/Aq | 0.3 | 0.15 |
| Separation Factor | 4–5 | 4–5 |

Operation of the extraction units is carried out to achieve the best balance between product purity and yield of zirconium. Increased purity of zirconium can be obtained at the expense of yield and hafnium purity. With our method of operation, it is possible to obtain a yield of better than 96% of zirconium containing about 100 p.p.m. hafnium while obtaining hafnium product containing between 0.5% and 3.0% zirconium.

Even greater separation and production rates may be achieved by increasing the length and diameters of the columns, respectively, and proportionately increasing rates of flow of process liquids.

Only one column, containing superimposed all the functions of the multiple column herein described, would be suitable for the operation of our invention. However, for greater compactness, protection from breakage, and easier access for maintenance repair work, the breakdown of process functions into separate columns is preferred and an even larger number of still shorter column sections may be utilized, if desired. In addition, the column and associated apparatus may be constructed out of material other than glass, such as suitable plastics or corrosion resistant metal.

The following is an example illustrating by a laboratory test the criticalness of the percentage composition and the satisfactory behavior of a 25% butyl acetate–75% hexone mixture (which we have described herein as resulting in a significant reduction in the decomposition of thiocyanate).

EXAMPLE II

Four 30 milliliter portions of 100% hexone, 25% butyl acetate–75% hexone, 50% butyl acetate–50% hexone, and 75% butyl acetate–25% hexone, respectively, 2 molar in thiocyanic acid were equilibrated with an aqueous solution containing 0.27 grams of $ZrOCl_2$, $8H_2O$ (1.5% hafnium content), 0.48 gram of $(NH_4)_2EO_4$, 2 grams of $(NH_4)SCN$ and 0.5 milliliter of active hafnium solution (for analytical purposes) in 5 milliliter volume with sufficient hydrochloric acid added to give a 2 molar hydrochloric acid concentration. The distribution and separation factors resulting from the above equilibrations are shown in Table I, as follows:

*Table I*

EXTRACTION TESTS

| Composition of Organic Phase | 100% Hexone | 25% Butyl Acetate, 75% Hexone | 50% Butyl Acetate, 50% Hexone | 100% Butyl Acetate |
|---|---|---|---|---|
| Percent Hf Extracted | 93 | 90 | 80 | 51 |
| Percent Zr Extracted | 27 | 20 | 15 | 7 |
| Separation Factor | 34 | 36 | 23 | 13 |

The decomposition of thiocyanate, noted in hexone alone, is substantially completely eliminated. The above and additional results show that, although the use of approximately 20% to approximately 25% butyl acetate by volume in hexone in place of 100% hexone as the organic solvent in our hafnium-zirconium solvent extraction process does slightly reduce the extraction of both hafnium and zirconium from the aqueous phase into the organic phase, the separation factor remains substantially the same.

EXAMPLE III

Example III illustrates the use of sulfate in the feed material. The mixer-settler apparatus of Fig. 2 was utilized. The following conditions were employed in six mixer-settler stages plus 2 extra stages of mixing and settling in which the hexone was brought into countercurrent contact with 25% sulfuric acid. The sulfuric acid removed the dissolved metals (zirconium and hafnium) from the solvent and left most of the thiocyanic acid so that the hexone could then be reused.

The hafnium content of the feed, based on zirconium, was 1.5%.

| Aqueous Phase | Organic Phase | Scrubbing Solution |
|---|---|---|
| 0.2 molar $ZrCl_4$. 2.0 molar added HCl. 0.75 molar $(NH_4)_2SO_4$. 1.75 molar $NH_4SCN$. Flow rate 25 cc./min. | Hexone containing 2.0 molar HSCN. Flow rate 150 cc./min. | 25% $H_2SO_4$. Flow rate 15 cc./min. |

Under these conditions the product aqueous solution was substantially free of hafnium.

In general, it may be said that the above examples are merely illustrative and should not be construed as limiting the scope of our invention. Any metal cation which complexes with thiocyanate may be separated using systems such as herein described. Furthermore, numerous reagent recycle variations and combinations are possible within the scope of the foregoing description. Thus, the scope of my invention should be understood to be limited only as indicated by the appended claims.

We claim:

1. An improved solvent extraction process for effecting substantially quantitative separation of hafnium impurities from zirconium values which comprises contacting an aqueous feed solution phase containing zirconium, hafnium, and chloride values, with a methyl isobutyl ketone phase, at least one of said phases containing thiocyanate values, separating the resulting zirconium enriched aqueous phase from the resulting hafnium enriched methyl isobutyl ketone, contacting said hafnium enriched methyl isobutyl ketone with an aqueous hydrochloric acid solution, separating the resulting zirconium-containing hydrochloric acid solution from the resulting zirconium-depleted, hafnium-enriched methyl isobutyl ketone, and acidifying said feed solution with the resulting zirconium-containing hydrochloric acid solution.

2. The process of claim 1 wherein the zirconium-depleted hafnium-enriched methyl isobutyl ketone is contacted with an aqueous sulfuric acid solution, the resulting hafnium-containing sulfuric acid solution is separated from the resulting thiocyanate-containing methyl isobutyl ketone, and the resulting thiocyanate-containing methyl isobutyl ketone is contacted with fresh feed solution.

3. An improved solvent extraction process for effecting substantially quantitative separation of hafnium impurity from zirconium values which comprises preparing an aqueous feed solution approximately 0.2 molar to approximately 1.5 molar in hafnium-containing zirconium tetrachloride, approximately 2 molar to approximately 5 molar in ammonium thiocyanate, continuously acidifying said feed solution to approximately 0.5 to approximately 2 molar in hydrochloric acid, continuously contacting the resulting acidified feed solution with a countercurrent stream of methyl isobutyl ketone containing approximately 2 molar to approximately 5 molar thiocyanic acid, at a flow ratio of approximately 3 parts to approximately 9 parts of methyl isobutyl ketone to about 1 part aqueous phase, continuously separating the resulting zirconium enriched thiocyanate-containing aqueous phase from the resulting hafnium-enriched thiocyanate-containing organic phase, continuously contacting the separated zirconium-enriched thiocyanate-containing aqueous phase with a countercurrent stream of methyl isobutyl ketone at a flow ratio of about 1 part methyl isobutyl ketone to about 1 part to about 3 parts aqueous phase and continuously separating the resulting thiocyanate-containing methyl isobutyl ketone from the resulting thiocyanate-free zirconium enriched aqueous phase, continuously contacting fresh portions of said acidified feed solution with a countercurrent stream of the resulting thiocyanate-containing methyl isobutyl ketone, continuously contacting said hafnium enriched thiocyanate-containing methyl isobutyl ketone with a countercurrent stream of an aqueous solution approximately 2 molar to approximately 3.5 molar in hydrochloric acid at a flow rate ratio of about 1 part aqueous solution to about 4 parts to about 9 parts methyl isobutyl ketone, continuously separating the resulting zirconium-containing hydrochloric acid solution from the resulting zirconium-depleted thiocyanate-containing hafnium-enriched methyl isobutyl ketone, continuously acidifying said feed solution with the resulting zirconium-containing hydrochloric acid solution, continuously contacting the zirconium-depleted thiocyanate-containing hafnium-enriched methyl isobutyl ketone with a countercurrent flow of approximately 2 molar to approximately 7 molar aqueous sulfuric acid solution at a flow ratio of approximately 1 part aqueous to about 3 parts to about 5 parts methyl isobutyl ketone, continuously separating the resulting hafnium-containing sulfuric acid solution from the resulting thiocyanate-containing methyl isobutyl ketone, continuously contacting a portion of said thiocyanate-containing methyl isobutyl ketone with a countercurrent stream of fresh feed solution, continuously neutralizing the remaining portion of said thiocyanate-containing methyl isobutyl ketone with ammonium hydroxide, continuously separating the resulting ammonium thiocyanate-containing aqueous phase from the resulting thiocyanate-free methyl isobutyl ketone, continuously contacting said zirconium-enriched thiocyanate-containing aqueous phase with thiocyanate-free methyl isobutyl ketone and continuously employing said aqueous thiocyanate solution in the preparation of said feed solution.

References Cited in the file of this patent

UNITED STATES PATENTS

| | | |
|---|---|---|
| 2,227,833 | Hixson et al. | Jan. 7, 1941 |
| 2,578,623 | Asselin et al. | Dec. 11, 1951 |

OTHER REFERENCES

Leaders et al.: U.S. Atomic Energy Commission declassified Paper No. Y-559, Feb. 1, 1950, declassified Nov. 18, 1955, 31 pages. Available from Office of Technical Services, Dept. of Commerce, Washington 25, D.C. Price 25¢.

Weinhardt et al.: "Industrial and Engineering Chemistry," vol. 43, No. 7, pages 1676–1684 (1951).

Morton: "Laboratory Technique in Organic Chemistry," pages 198, 199 (1938), published by McGraw-Hill Book Co., N.Y.

Fischer et al.: "Zeitschrift für anorganische und Allgemeine Chemie," vol. 249, pages 173–184 (1942); vol. 255, pages 79–100 (1947); and vol. 255, pages 277–286 (1948).

Waldrop et al.: U.S. Atomic Energy Commission declassified Paper No. Y-612, June 6, 1950, declassified Nov. 17, 1955, 32 pages. Available from Office of Technical Services, Dept. of Commerce, Washington 25, D.C. Price 25¢.

UNITED STATES PATENT OFFICE

CERTIFICATE OF CORRECTION

Patent No. 2,938,769                              May 31, 1960

Lyle G. Overholser et al.

It is hereby certified that error appears in the printed specification of the above numbered patent requiring correction and that the said Letters Patent should read as corrected below.

Column 7, line 55, for "proportionate" read -- proportioning --; column 8, line 26, after "from" insert -- pump --; column 10, line 22, for "$(NH_4)_2EO_4$" read -- $(NH_4)_2SO_4$ --.

Signed and sealed this 4th day of April 1961.

(SEAL)
Attest:    ERNEST W. SWIDER

XXXXXXXXXX
Attesting Officer

ARTHUR W. CROCKER
Acting Commissioner of Patents